Sept. 6, 1955  E. C. WILEY  2,716,874
COMBINED SOUND CHANGE OVER AND VOLUME CONTROL
FOR SOUND MOTION PICTURE PROJECTORS
Filed May 27, 1952
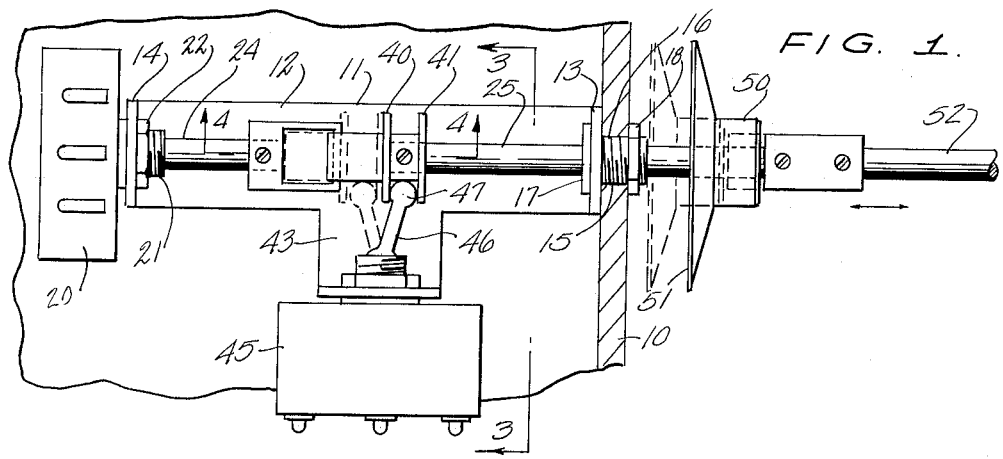
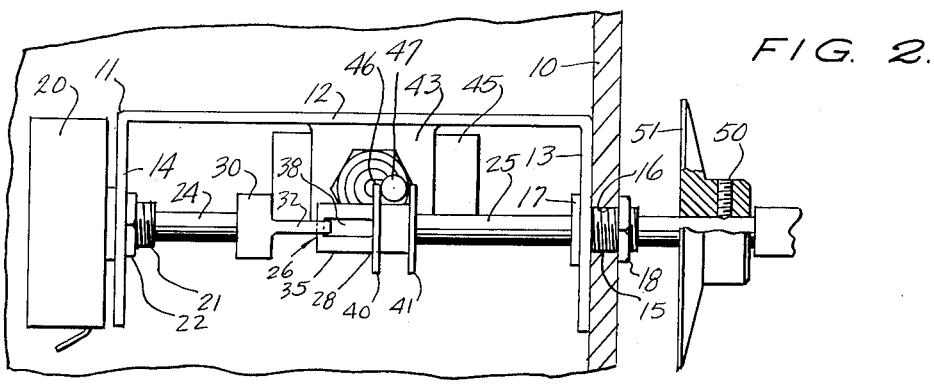
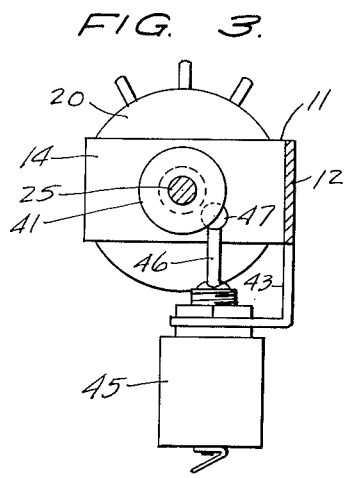
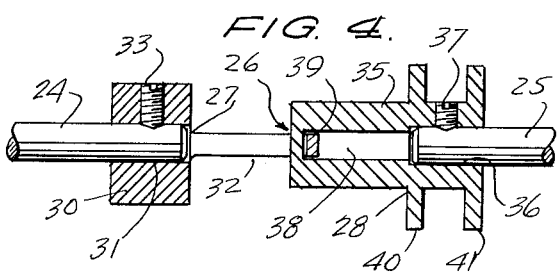
INVENTOR
EVANS C. WILEY,
BY
McMorrow, Berman + Davidson
ATTORNEYS

United States Patent Office 2,716,874
Patented Sept. 6, 1955

2,716,874

COMBINED SOUND CHANGE-OVER AND VOLUME CONTROL FOR SOUND MOTION PICTURE PROJECTORS

Evans C. Wiley, Cape Girardeau, Mo.

Application May 27, 1952, Serial No. 290,192

1 Claim. (Cl. 64—23)

This invention relates to a manually operated change over device for switching a sound amplifier circuit from one sound motion picture projector to another, such projector as the end of the film on the reel of the one projector is reached and projection of another reel of film is taken up by the other projector, and more particularly to an improved device of this character which involves only one control knob or handle, by means of which the sound amplifying circuit can be switched from one projector to another, and the sound volume on the other projector can be adjusted, so that the operator does not have to operate two or more knobs or handles in succession in order to shift the sound amplifier circuit and adjust the sound volume.

It is among the objects of the invention to provide an improved change over device for shifting a sound amplifier circuit from one to another sound picture projector which utilizes a single knob or handle for transferring the sound amplifier circuit and for regulating the sound volume; which can be applied to existing or new sound amplifiers with no material modification of the amplifier construction; which enables an operator to shift the sound amplifier circuit from one projection machine to another and immediately regulate the sound volume of the other machine; which permits regulation of the sound volume at any time without shifting the circuit and shifting the circuit without change of the sound volume; and which is simple and durable in construction, economical to manufacture and easy to install, and positive and effective in operation.

Other objects and advantages will become apparent from a consideration of the following description and the appended claim in conjunction with the accompanying drawing, wherein:

Figure 1 is a side elevational view of a combined sound amplifier circuit shifting and sound volume regulating device illustrative of the invention;

Figure 2 is a top plan view of the device illustrated in Figure 1;

Figure 3 is a cross sectional view on the line 3—3 of Figure 1; and

Figure 4 is a fragmentary cross sectional view on an enlarged scale on the line 4—4 of Figure 1.

With continued reference to the drawing, the illustrated circuit shifting and regulating device is mounted on a relatively fixed support 10, such as a housing wall of a sound motion picture amplifier or unit thereof, and includes an elongated U-shaped bracket 11 including bight portion 12 and legs 13 and 14 extending perpendicularly to the same side of the bight portion and each provided with an aperture spaced from the bight portion of the bracket.

A threaded bushing 15 extends through the aperture in the bracket leg 13 and through an opening 16 in the supporting wall 10 and has at one end an external, annular flange 17 bearing against the bracket leg 13 at the side of the latter remote from the wall 10. A nut 18 is threaded onto the bushing at the side of the supporting wall 10 remote from the bracket leg 13 and firmly secures the bracket to the supporting wall 10 in a position in which the bracket projects outwardly from the supporting wall substantially perpendicular thereto.

A rotatable volume control 20 is disposed at the outer side of the other bracket leg 14 and is secured to the bracket by a threaded bushing 21 secured at one end to the device 20 and extending through the aperture in the bracket leg 14, and a nut 22 is threaded onto the bushing 21 at the side of the bracket leg 14 remote from the volume control device 20. A shaft 24 is connected at one end to the volume control 20 and extends through the bushing 21, being journaled in the latter, and a shaft 25 extends through and is journaled in the bushing 15 and disposed in longitudinal alignment with the shaft 24.

The adjacent ends of the shafts 24 and 25 are spaced apart, as illustrated in Figure 4, and a two part coupling, generally indicated at 26, couples the shafts 24 and 25 at their adjacent ends and is effective to provide a limited freedom of longitudinal movement of the shaft 25 relative to the shaft 24 while precluding relative rotational movement between the two shafts.

The coupling, as illustrated, includes two interconnected elements 27, mounted on the shaft 24, and 28, mounted on the shaft 25. The member 27 comprises a ring or block 30 having a bore 31 therethrough in which the corresponding end portion of shaft 24 is received, and an open link 32, of rectangular shape reaching from the block 30 to the adjacent end of the shaft 25. The block 30 is provided with a tapped hole extending radially of the bore 31 and a set screw 33 is threaded through this tapped hole and bears at its inner end against the shaft 24 to secure the element 27 on the shaft.

The element 28 comprises an elongated body portion 35 having in one end a bore 36 receiving the corresponding end portion of the shaft 25 and is provided with a tapped hole extending radially of the bore 36 and receiving a set screw 37 which bears at its inner end against the shaft 20 and secures the body 35 on the shaft. The body 35 projects longitudinally beyond the adjacent end of the shaft 25 and is provided with a transversely extending opening 38 of rectangular cross sectional shape through which a transverse portion 39 of the link 32 extends. The transverse portion 39 of the link 32 is also of rectangular cross sectional shape and closely fits the opening 38 in the body 35 so that the shafts 24 and 25 are coupled together for simultaneous and coextensive rotational movements. The transverse portion 39 has a thickness materially less than the length of the opening 38 so that the shaft 25 can be moved longitudinally toward and away from the adjacent end of the shaft 24 without interruption of the rotational coupling therebetween.

Spaced apart and substantially parallel external flanges 40 and 41 of substantially circular shape, are provided on the member 28 and coaxially surround the bore 36 and shaft 25 for a purpose which will presently appear An L-shaped arm 43 projects perpendicularly from the bight portion 12 of the bracket 11 substantially at the mid-length location of the bight portion, and a toggle switch 45 is mounted on the arm 43 and is connected into the sound amplifying inputs of the two alternately usable sound motion picture projectors in a manner to transfer the sound amplifying circuit from one projector to the other as the toggle lever 46 is moved from one to the other of its two operative positions by moving the knob 50 endwise. At its end remote from the switch the toggle lever 46 is provided with a ball formation 47 which is received between the flanges 40 and 41 on the coupling member 28 so that the switch can be moved from one to the other of its operative positions by longitudinal movement of the shaft 25.

An operating dial or knob 50 is mounted on the shaft 25 at the end of the latter remote from the shaft 24 for manually rotating the two shafts and moving the shaft 25 longitudinally, and has a beveled annular flange 51 which carries indicia thereon to enable setting the knob relative to a reference point (not shown). The knob 51 is spaced from the wall 10 so that it can move toward and away from the wall as the shaft 25 is moved endwise. A suitable reference point, not illustrated, is mounted on the wall and cooperates with the indicia on the knob to indicate the adjustment of the volume regulating device 20.

A shaft 52 is connected to the knob 50 and projects from this knob in a direction away from the supporting wall 10 and may be connected at its other end to a volume regulating device, not illustrated, similar to the device 20 for regulating the sound volume produced by another projector.

With this arrangement, as soon as the operator has operated the switch 45 to switch the sound amplifier circuit from one to another projector, he can immediately regulate the sound volume produced by the second projector without removing his hand from the control knob 50 thereby avoiding any lapse of time between the shifting of the circuit and the regulation of the sound volume.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In combination, a support, first and second axially aligned shafts mounted on said support for endwise and rotary movements relative to said support, said shafts having axially inward ends, coupling means comprising a body fixed on said first shaft and a link fixed on said second shaft, said body having a transverse slot opening through opposite sides of said body, said slot having a closed terminal end spaced from one end of said body and an open end opening through the other end of the body, said body having a longitudinal opening communicating with the open end of the slot and the axially inward end of said first shaft being secured in said opening at the open end of the slot, said link having side members positioned at opposite sides of said body and a transverse member extending between said side members and engaging through said slot, said transverse member being shorter lengthwise of said body than the distance between the closed terminal end of the slot and the axially inward end of the first shaft whereby endwise movements of said body relative to said link are limited only by engagement with the axially inward end of the first shaft and the terminal end of the slot, and means on said first shaft for rotating said first shaft relative to the support and moving said first shaft endwise relative to said second shaft and relative to the support.

References Cited in the file of this patent

UNITED STATES PATENTS

| 1,890,375 | Garrett | Dec. 6, 1932 |

FOREIGN PATENTS

| 407,421 | Great Britain | Mar. 22, 1934 |